United States Patent [19]
Paule et al.

[11] 3,903,440
[45] Sept. 2, 1975

[54] HOUSING FOR OPERATED POWER TOOLS

[75] Inventors: Kurt Paule; Gerhard Armbruster, both of Stuttgart, Germany

[73] Assignee: Robert Bosch G.m.b.H., Stuttgart, Germany

[22] Filed: Oct. 19, 1972

[21] Appl. No.: 299,019

[30] Foreign Application Priority Data
Oct. 22, 1971 Germany.......................... 21525859

[52] U.S. Cl. ................................................. 310/50
[51] Int. Cl.² ......................................... H02K 7/14
[58] Field of Search ..................................... 310/50

[56] References Cited
UNITED STATES PATENTS

| | | |
|---|---|---|
| 2,642,920 | 6/1953 | Simon et al........................... 310/43 |
| 3,119,942 | 1/1964 | Luther............................... 310/50 X |
| 3,121,178 | 2/1964 | Seyfried et al........................ 310/50 |
| 3,259,770 | 7/1966 | Mattson et al........................ 310/50 |
| 3,359,637 | 12/1967 | Hansen................................ 310/50 |
| 3,432,703 | 3/1969 | Sheps et al........................... 310/50 |
| 3,652,879 | 3/1972 | Plunkett et al. ...................... 310/50 |
| 3,749,951 | 7/1973 | Artin et al. ........................ 310/50 X |

Primary Examiner—William M. Shoop
Attorney, Agent, or Firm—Michael S. Striker

[57] ABSTRACT

A housing for use in hand operated power tools having an electromotor and elements driven thereby, as well as a method of making such a housing, is disclosed. The housing may be made entirely from rigid foam plastic, or it may be made in form of a thin-walled inner plastic housing which is surrounded by an outer housing of foam plastic.

9 Claims, 12 Drawing Figures

HOUSING FOR OPERATED POWER TOOLS

BACKGROUND OF THE INVENTION

The present invention relates to housings for electrical appliances, and more particularly to plastic housings for hand power tools.

Plastic housings per se for power tools are already known. However, these known housings have the disadvantage that their construction requires resort to injection molding with the attendent high operating pressures and temperatures. Accordingly, because it is frequently costly to produce housings at such high pressures and temperatures, the cost of the finished housings has been proportionately high. Also, the properties of the plastics which are suitable for injection molding, that is their brittleness and susceptibility to breakage, have frequently made it necessary in prior-art plastic housings to take special measures to assure a satisfactory resistance to breakage or for increasing the tensile stress which the housings can absorb. One method which has been frequently used to increase the strength of the housings has been to incorporate therein glass fibers. This of course is also more expensive than is desirable. The prior-art housings have still a further disadvantage in that they do not provide sufficient insulation against the heat and noise generated by the motor which drives the power tool.

It is a general object of the present invention to overcome the disadvantages of the prior art.

More particularly, it is an object of the invention to provide a housing for power tools which does not possess the aforementioned disadvantages.

Another object of the invention is to provide a housing of the type under discussion which is simple in construction and economical to manufacture and which can be made so inexpensively that it is even feasible to discard it when it becomes damaged, or to discard it along with the entire power tool when the tool becomes damaged.

Another object of the invention is to provide such a housing which is resistant to shocks.

Still an additional object of the invention is to provide a housing for hand operated power tools which provides better insulation than heretofore, against heat and noise generated by the motor and the elements driven by the motor contained in the housing.

An additional object is to provide a method of making such a housing.

In keeping with these objects, and others which will become apparent hereafter, one feature of the invention resides, in a hand-operated power tool, in a combination comprising an electro-motor and elements driven thereby, and housing means which at least partially encloses and carries the motor and the element driven thereby. The housing means according to the invention is made at least substantially of rigid foam plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1a illustrates one detail of the construction of FIG. 1;

DESCRIPTION OF THE PREFERRED EMBODIMENTS

Figure 1:
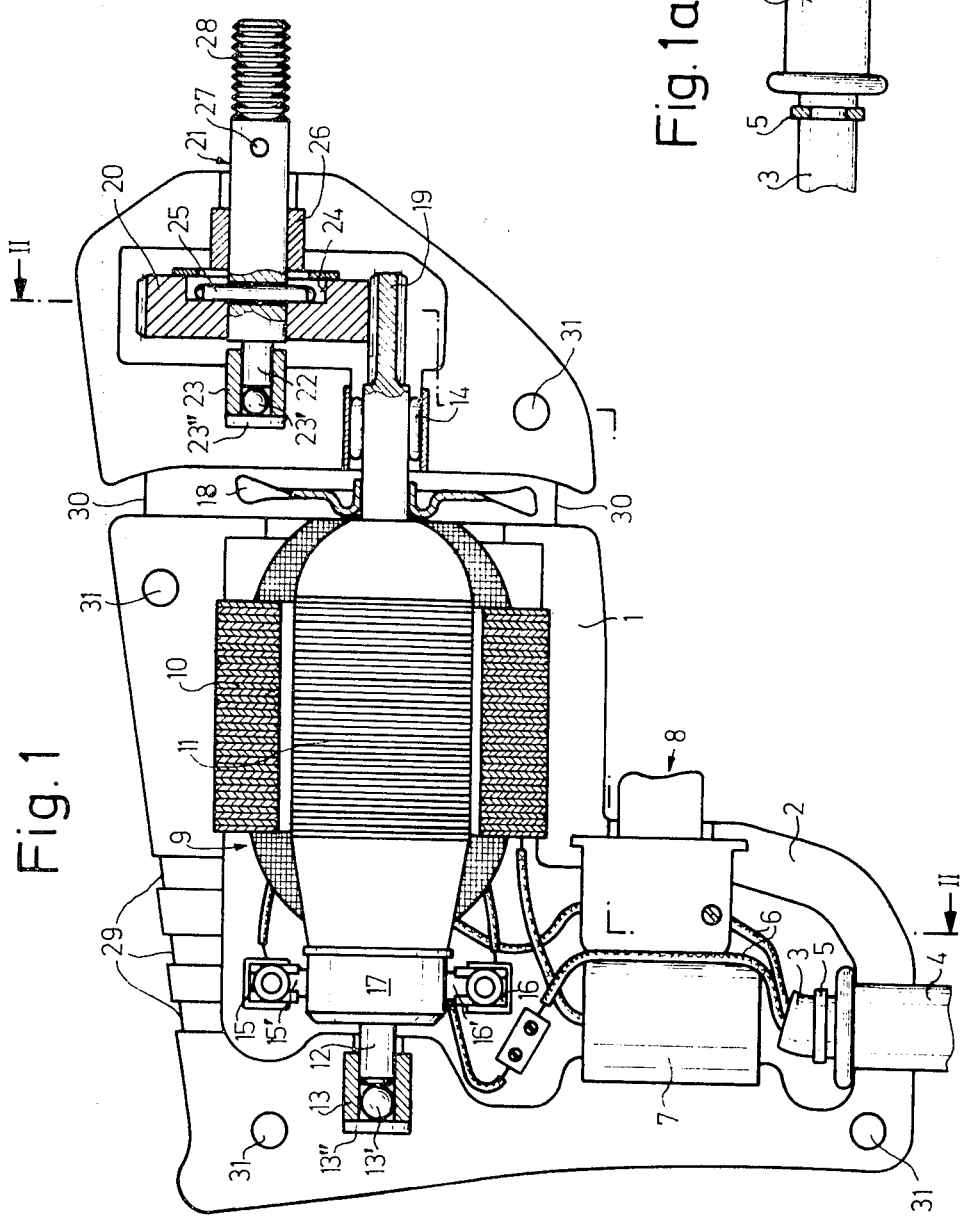
FIG. 1 is a side-elevational view of an electrical hand drill incorporating the housing according to the present invention, the drill being shown disassembled with one of the housing shells removed.

Coming now to a detailed description of the drawing it should first be pointed out that for the purposes of the following description, several directions will be defined to facilitate the description of the invention. The "working side" is the direction of the hand drill towards the workpiece, i.e. towards the right as viewed in FIG. 1. On the other hand, the "gripping side" is the direction opposite to the working side, i.e. towards the left as viewed in FIG. 1.

Referring now firstly to FIG. 1, it will be seen that a hand drill is there illustrated which is constructed with a housing having two shell-shaped halves made from rigid foam plastic material. The two shell sections are connectable, as will hereafter be described, to form the housing which is adapted to enclose an electromotor and elements driven thereby. In FIG. 1, however, only one shell 1 is illustrated, the other shell having been removed to show the construction of the interior of the housing as well as of the mechanical parts which are accommodated therein.

According to the invention the rigid foam material of the shell is hard foam, e.g. hard polyurethane foam, of the type known as "integral foam". This is foam material having a cellular core and being densified in the region of its outer surfaces so as to from a skin without cellular structure in these regions. Such foams are well known per se.

The shell 1 is so configured as to have a hand grip 2. A power supplying cable 3 is brought into the hand grip 2 through a protective rubber sleeve 4. The cable 3 is provided with an indentation or annular groove and a snap ring 5 is snapped therein to insure against pulling-out of the cable from the housing. The leades 6 which comprise the power cable 6 are connected by means of an interference-suppressing condenser 7 to an electrical drive motor 9 which is advantageously of the type which can be energized by both alternating and direct current. The stator core 10 of the motor is arranged in a recess portion of the housing shell 1 and the rotor 11 of the motor is mounted on a motor shaft 12 which itself is mounted in the housing shell 1 on two end bearings 13 and 14.

The motor shaft 12 is rotatably mounted in the bearings of which the one identified with reference numeral 13 is constructed as a sleeve bearing and has a ball 13' and a butting ring or plate 13" cooperating with the ball 13' to function as a pressure or thrust bearing. In this manner, the motor shaft 12 is subjected to substantially less friction by abutting against the ball 13' than if it were to abut directly against the plate 13" since rolling friction resulting from point contact is of course substantially less than sliding friction. The bearing 14 is constructed as a needle bearing.

Brush holders 15 and 16 are provided for holding carbon brushes 15' and 16'; the holders 15 and 16 are located at the gripping side of the housing shell 1 and the brushes are adapted to engage and cooperate with a collector 17 which is connected to the rotor 11 in a well-known manner. The rotor 11 is mounted on shaft 12 and arranged to share the rotation thereof.

On the working side of the shaft 12 there is provided a cooling fan 18. A pinion or a gear 19 which is either made integral with or arranged on the end of the shaft 12. The pinion 19 engages and meshes with a gear 20 fixedly mounted on and cooperating with a tool spindle 21 which has a pin 22 at the gripping side end, which pin 22 is rotatably mounted in the housing shell 1 by being positioned in the sleeve bearing 23. Bearing 23 comprises a ball 23' and a plate 23" which cooperate as a pressure or thrust bearing, similar to the construction of the bearing 13. Gear wheel 20 has a face turned on the working side of the unit and a narrow slot 24 is provided in this face for coupling the spindle 21 with the gear wheel 20. An elongated pin 25 extends through a transverse hold of the spindle 21 and is arranged in the slot 24 for coupling the spindle to the gear wheel 20 and for sharing rotation with the gear wheel about the axis of the latter. A bushing 26 is arranged in the housing shell 1 and acts as a bearing for the working end of the spindle 21. The spindle is provided, at the working end thereof, with a transverse hole 27 and a screw thread 28 which is adapted for meshing engagement with the drill chuck in a well-known manner. Hole 27 is to receive an elongated member which can be held to prevent rotation of the spindle while the chuck is being tightened thereon.

A plurality of slots 29 is provided in the region of the collector 17, and a slot 30 is provided in the region of the fan 18. Slots 29 are arranged as inlet openings through which cooling air may enter the interior of the housing to cool the motor around the driven parts, the air being drawn in by the action of the fan 18 which is positioned towards the working end of the drill. The air, having entered through the inlet slots 29 and circulated about the motor, is then expelled through the slot 30.

Figure 2:
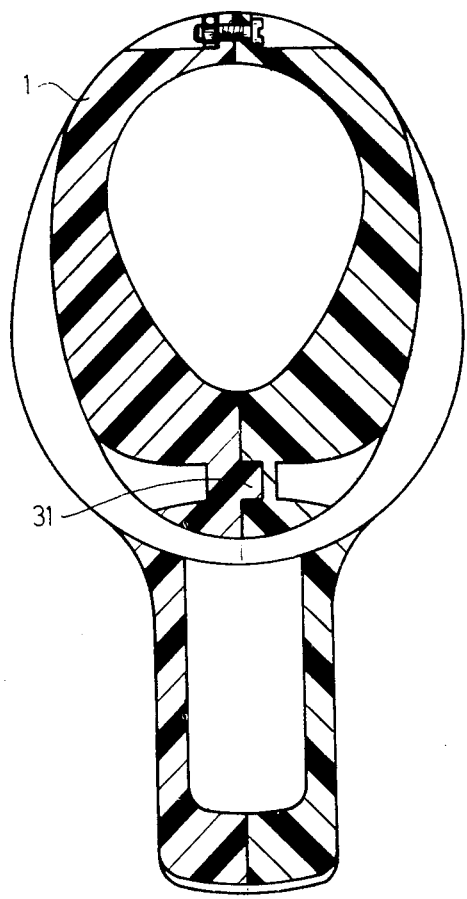
FIGS. 2–6 are transverse cross sections, some in fragmentary detail view, which illustrate different connecting means for connecting the shell sections of the housing in FIG. 1.
Figure 3:
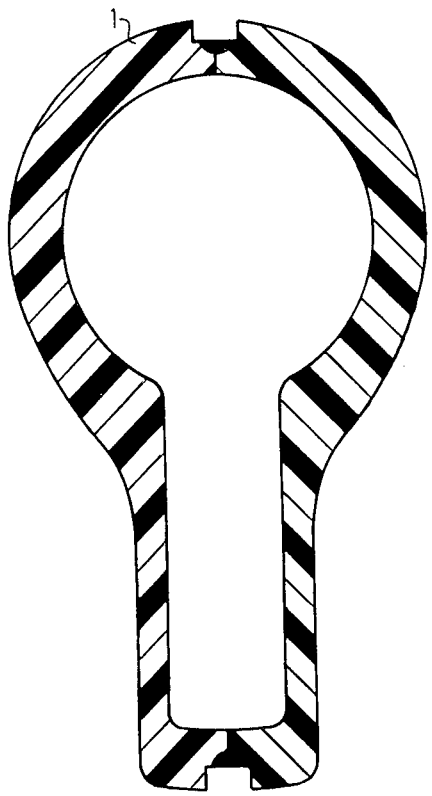
Figure 4:
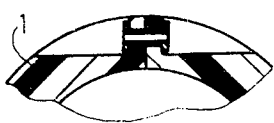
Figure 6:
Figure 5:

A plurality of pins 31 is positioned about a peripheral portion of the housing shell 1 and arranged for aligning the non-illustrated mating shell which is provided with corresponding holes, so that the shells can be connected with one another. After the shells have been thus aligned and brought into abutment against one another they may be connected by means of screws as shown in FIG. 2, or by means of welded seams as shown in FIG. 3, or again by the rivetting connections shown in FIGS. 4 and 5. In FIG. 4 the sections are shown to be connected by tubular or hollow rivets while in FIG. 5 they are connected by solid rivets integral with one of them. FIG. 6 shows still a further possibility of connecting the two shells, namely by means of a clamp.

Figure 7:
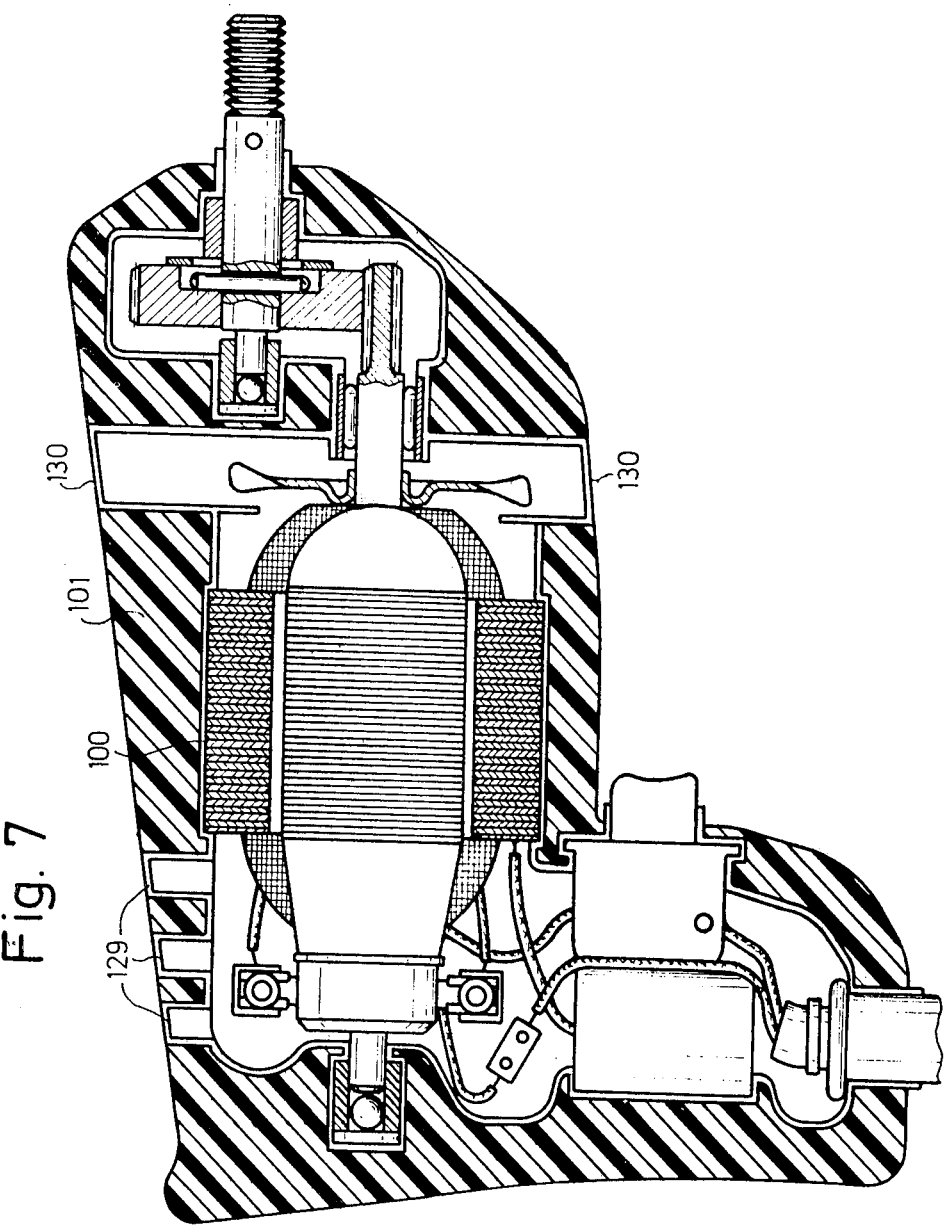
FIG. 7 shows another embodiment of the housing of the present invention.

In FIG. 7 there is illustrated a further embodiment of a hand drill made with the housing of rigid foam plastic. In this embodiment it is not the entire housing that is made from rigid foam plastic, but instead there is provided a thin-walled inner housing 100 consisting of synthetic plastic or other suitable material but not of cellular material. The inner housing 100 generally has the same outline or shape as the final shape of the assembled housing and is provided with spaces for the pressure switch 8, the capacitor 7, the motor 9 as well as the gear wheels and other driven parts. However, the inner housing is so configurated as to enclose the working parts with minimum clearance so that the volume of the inner housing is substantially less than the volume and dimensions of the completed drill, although the shapes may be similar.

The inner housing 100 may also be made of two shell sections, similarly as the shell section 1 in FIG. 1. The two complementary shell sections forming the inner housing 100 can be aligned and connected or fixed to one another by various means. For instance, they may be connected by welding, by snapping-together, by clamping or the like. Once such a connection is established, the exterior of the inner housing 100 is surrounded by the rigid foam plastic which is to form the outer housing. The plastic to be formed is applied as a foam layer which is foamed and allowed to harden, and slots 129 and 130 are provided for the inlet and the outlet of cooling air; these slots can be formed by punching, milling or the like. It is also contemplated that cooling air slots in the shells of the inner housing may be initially provided and may be closed by suitable inserts while the foam plastic for the outer housing is applied to and foamed at the exterior of the shells of the inner housing. Once the outer housing has been completed, the inserts can then be removed to reopen the slots in the inner housing.

Figure 8:
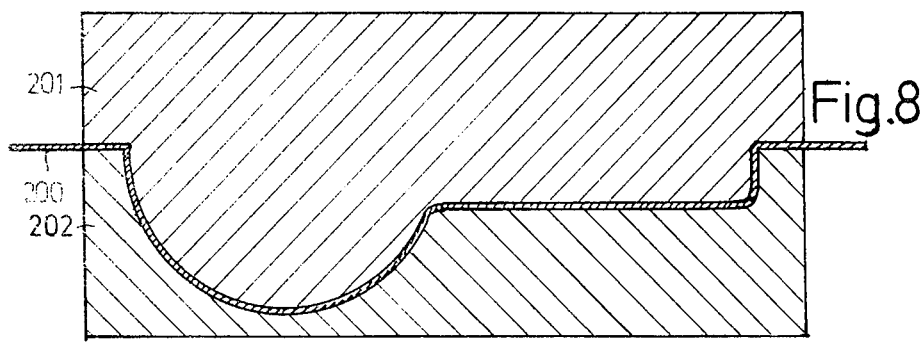
FIG. 8 is a diagrammatic illustration of an arrangement for making a shell of a housing according FIG. 7, in accordance with one method of making it.
Figure 9:
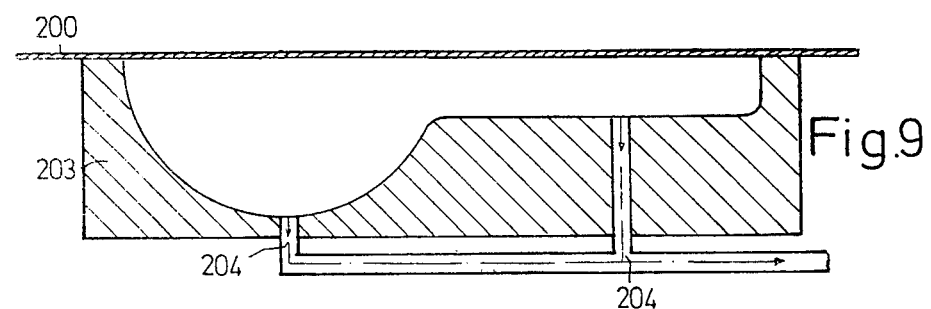
FIG. 9 is a view similar to FIG. 8 illustrating a further possibility of making the housing.

As shown in FIG. 8, the plastic for the shells of the inner housing 100 may be supplied in form of a thin plate 200 which can be subjected to deep drawing in well-known manner between an upper die 201 and a lower die 202 under application of elevated temperature. FIG. 9 shows that it is also possible to use such a plate 200 in which the inner housing shell is formed using only a lower die 203 having channels 204 which are connectable with a non-illustrated source of vacuum or suction, thus producing the housing shell by vacuum drawing. Again, the material of the plate 200 is subjected to heating and the atmospheric air replaces in this embodiment the upper die.

Figure 10:
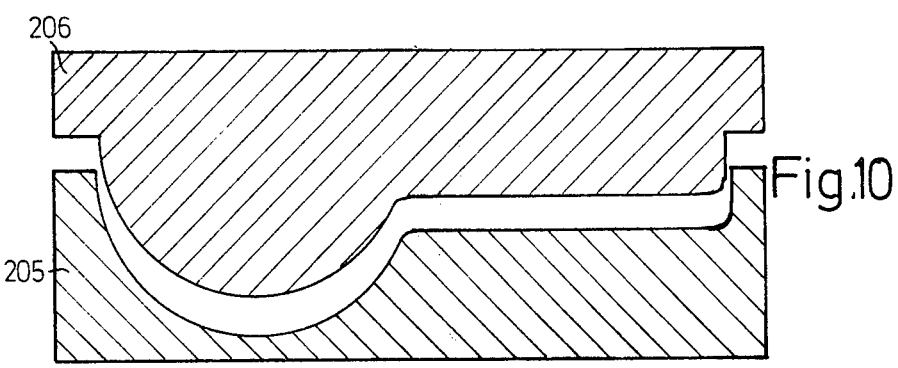
FIG. 10 is a view similar to FIG. 9 illustrating an additional possibility of making the housing.

The housing shells may also be produced by starting with powder as the initial material, that is the synthetic plastic material to be formed is supplied in form of powder which is placed into a lower die 205 as shown in FIG. 10, and is caused to sinter or melt at elevated temperature between the lower die 205 and an upper die 206.

Figure 11:
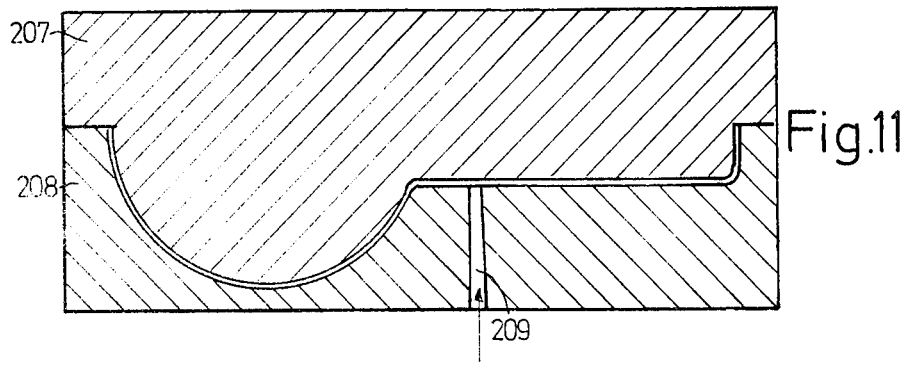
FIG. 11 is still an additional illustration showing a further possibility of making the housing.

Again, the starting material may be a flowable mass of synthetic plastic, and in this case FIG. 11 shows that a closed mold may be used composed of an upper die section 207 and a lower die section 208, with at least one of the die sections being provided with injection channels 209. The flowable material is then injected by means of a suitable press through the channels into the mold where it is allowed to harden. Of course, in each of these operations the hardening of the material should be understood as being part of the operation, but is not described because it is so well known per se that such a description is not believed to be necessary.

It may be clear that such a housing consisting of an inner housing surrounded by a one-piece foam plastic outer housing is not to be opened in the event of breakdown of the motor, the gear or one of the electric parts or connections incorporated. Since handwork for repairing a tool has become so expensive, housings of the type described are so constructed, that the tool is not to be opened and repaired, but to be discarded if no more use to the operator.

It will be clear from the various connecting means that can be utilized to connect two mating shell sections, that the biparfise housing according to the present invention and shown in FIG. 1 may be so constructed as to be capable of being opened, for instance when screws are used as shown in FIG. 2 to connect the two shell sections. Also, the shell sections can be permanently connected by welding, or by riveting or clamping. If the housing is connected permanently, it is usually not possible to make repairs to the hand tool when damage has occurred to the latter, or in the event of failure. In such instances the drill or other hand tool must then be disposed of. However, with this type of housing the cost of the tool can be substantially reduced so that in many instances it may be more economical to dispose of the tool rather than to incur expensive repairs.

It will be understood that each of the elements described above, or two or more together, may also find a useful application in other types of constructions differing from the types described above.

While the invention has been illustrated and described as embodied in housings for hand operated power tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a hand-operated power tool, a combination comprising an electromotor and elements driven thereby; and housing means at least partly enclosing and supporting said electromotor and said elements, said housing means including a self-supporting outer housing of rigid synthetic plastic material and having a foamed inner cellular core of said material which merges into a dense non-cellular outer skin of the same material as, and of one piece with, said inner cellular core.

2. A combination as defined in claim 1, wherein said foam plastic forming said housing means has an inner cellular core and dense non-cellular outer surface regions.

3. A combination as defined in claim 1, wherein said housing means comprises two symmetrical shell sections of said material which are connectable to one another.

4. A combination as defined in claim 1; said housing means further comprising a thin-walled inner housing for at least partly enclosing the motor and the elements driven thereby, said outer housing surrounding said thin-walled inner housing.

5. A combination as defined in claim 4, wherein said thin-walled inner housing is of synthetic plastic material.

6. A combination as defined in claim 4, wherein said inner housing is composed of two shells which are welded together.

7. A combination as defined in claim 4, wherein said inner housing is composed of two deep-drawn shells.

8. A combination as defined in claim 4, wherein said inner housing is composed of two vacuum-formed shells.

9. A combination as defined in claim 4, wherein said inner housing is composed of two press-formed shells.

* * * * *